United States Patent Office 2,940,797
Patented June 14, 1960

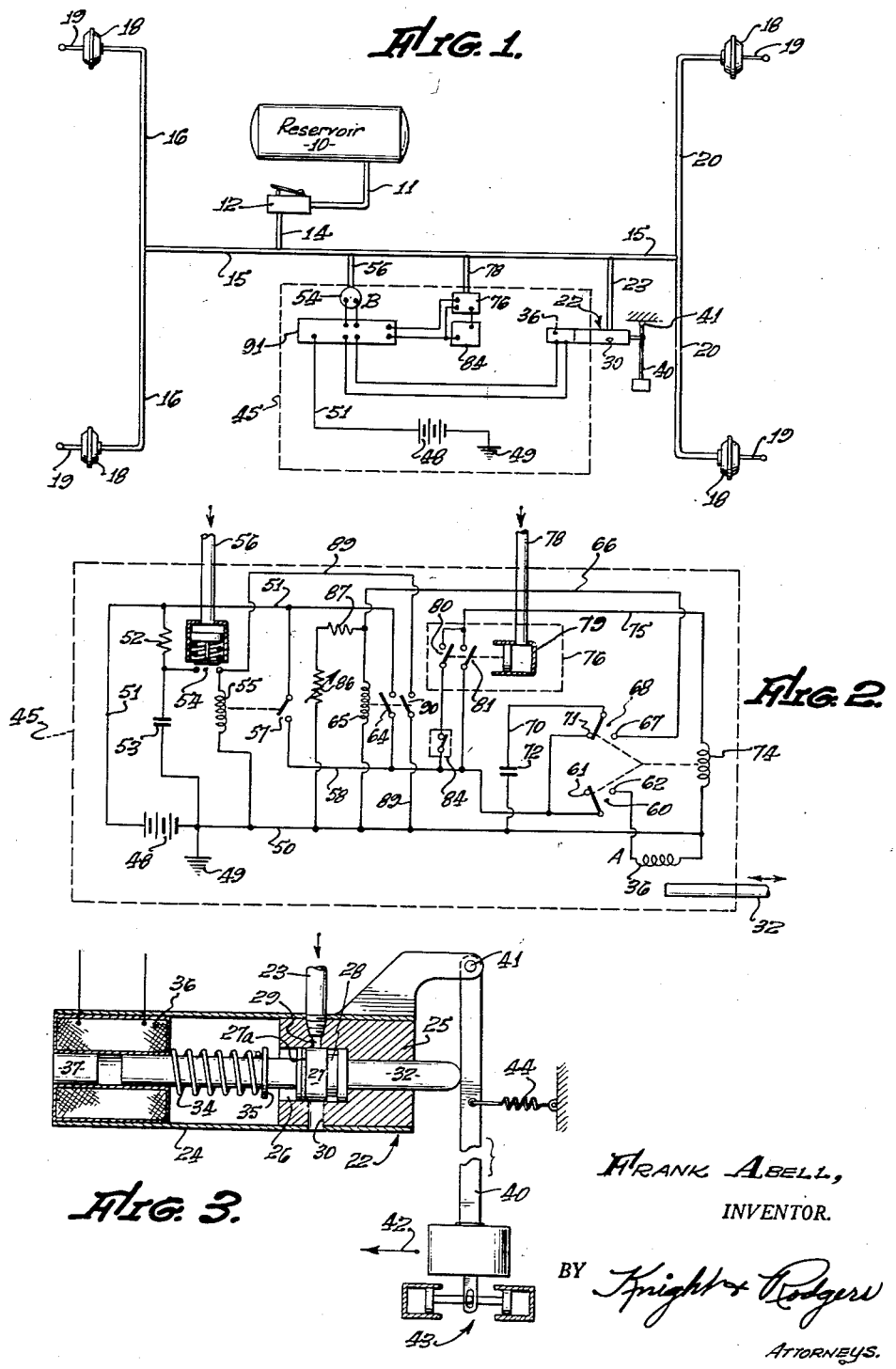
June 14, 1960  F. ABELL  2,940,797
BRAKE CONTROL APPARATUS
Filed Jan. 30, 1956
FRANK ABELL,
INVENTOR.
BY Knight & Rodgers
ATTORNEYS.

2,940,797
BRAKE CONTROL APPARATUS
Frank Abell, 631 Augusta St., Inglewood, Calif.
Filed Jan. 30, 1956, Ser. No. 562,190
10 Claims. (Cl. 303—24)

The present invention relates generally to fluid pressure actuated brake systems for vehicles, such as automobiles and trucks; and more especially to means for regulating the rate or degree of application of the brakes in response to variable factors, including the speed of the vehicle at the time of application of the brakes and the rate of deceleration produced by the brakes.

The need is widely recognized for brakes which are adequate to stop the vehicle as quickly as possible in order to produce the maximum degree of safety; but the fastest stops are not always the safest. The increasingly high speed of traffic, particularly within metropolitan areas, has imposed an increasingly severe task upon brake systems. This in turn has led to various improvements and additions to brake systems for producing more effective brakes. Along this line is the change from two wheel to four wheel brakes, from mechanical to hydraulic or pneumatic systems, and the addition of various power booster devices which multiply the braking effort that can be produced by the vehicle operator but at the same time tend to reduce the degree of control which the driver has over the brakes.

As a consequence of these improvements in design, brake systems now on automotive vehicles are capable of producing high rates of deceleration under emergency conditions. Under these conditions, passengers in the vehicles can be literally thrown around inside the vehicle with sufficient force that they may be injured even though there is no collision between two vehicles. The rapid decrease in speed now made possible is a prolific source of injuries to passengers; and it is a source of considerable concern to companies which operate passenger buses, especially buses which operate in congested traffic in metropolitan areas.

In an effort to eliminate this hazard of personal injury, devices have been suggested which limit the rate of application of the brakes. Of course the obvious danger is that the rate of application will be thereby reduced to the point that the brakes cannot be applied within what are considered safe limits as defined by various state laws. Failure to meet these minimum requirements by a common carrier would have serious results. Thus the demands made upon brake systems to be effective and also safe under a wide range of conditions are conflicting.

The problem is especially acute with passenger buses because of the great difference between the net weight of the vehicle alone and the gross weight loaded. This problem is increasing in modern designs because the weight of the vehicle is now decreasing for a given body size; or differently stated the ratio of the live load to the dead load is being increased by modern designs. As vehicles become lighter in proportion to the load carried, it is more and more necessary to design the brake systems in such a way that too much braking effort is not available when the vehicle is empty but there is still adequate braking effort when the vehicle is fully loaded. While driver training programs offer some assistance in solving this problem, driver training is not a final answer to the problem since training is generally forgotten under emergency conditions.

A complication in the solution of this problem is the fact that vehicles loaded with passengers behave exactly like empty vehicles when the brakes are first applied and until the deceleration of the passengers within the vehicles equals the deceleration of the vehicle itself. For a short interval after the brakes are applied, the brakes are stopping only the vehicle because the passengers are movable with respect to the vehicle and therefore are able to continue on at the same rate of speed because of their inertia. If time permits, passengers brace themselves by muscular reaction or by grasping a seat, strap or other part of the vehicle. In a fast stop, they may move forward bodily into violent contact with some part of the vehicle. In either case, the passengers thereafter move at the same speed as the vehicle and decelerate at the same rate. After the passengers have reached the same rate of deceleration as the vehicle body, the brakes are operating on the total mass of the vehicle and the passengers; and it will be appreciated that this mass may be considerably larger than the mass of the vehicle alone. Modern buses may have a live load of more than one third of the total gross weight.

Another complicating factor in the solution of the problem is that the co-efficient of friction on the brake shoe is not constant. It is less at high speeds than at low speeds. At the same time, in reducing the speed of the heavy vehicle from a high value to a low value the heat generated within the brake may be sufficient to reduce the co-efficient of friction at the lower speeds to a value considerably lower than the co-efficient existing if braking were started at the lower speed. An attempt to increase the power of the brakes to provide a reserve against this contingency results in the danger of locking the wheels when the brakes are applied at a relatively high speed, with obviously dangerous results.

Thus it becomes a general object of my invention to control the retardation of a vehicle, resulting from application of the vehicle brakes, in such a manner that the deceleration is decreased immediately after reaching a predetermined deceleration and is then restored to the higher predetermined value after lapse of a sufficient interval of time that the speeds of the passengers and the vehicle are equalized.

It is similarly an object of my invention to control the retardation of the vehicle in such a manner that the rate of restoration of the predetermined deceleration may be determined, at least in part, by the load of the vehicle in order to adapt the braking effort automatically to the load.

Another object of the invention is to reduce the maximum deceleration possible at low speeds in a manner to compensate for the greater co-efficient of friction existing when the brakes are initially applied at low speeds in order to protect the passengers against discomfort or injury caused by the greater percentage change of speed possible when the brakes are applied at low speeds.

An object is to safely raise the maximum fluid pressure or increase the lever ratio at the brake assembly.

Another object of the invention is to make the maximum brake effort and deceleration available at high speeds in order to compensate for the greater momentum of the vehicle and its load, in a manner consistent with the above objects.

The above and other objects of my invention are achieved in a control system constructed according to my invention and added to a conventional brake system for the purpose of regulating the rate of retardation of the vehicle. It is described as applied to a brake system using air under pressure as a medium for actuating the brakes but it can be modified easily for hydraulic brake systems. Suitable means is provided in the brake system which may be operated automatically to limit the pressure at which fluid is supplied to the brakes to apply them. In an air brake system, this pressure-limiting means is an exhaust valve connected to the air line between the source of compressed air and the brakes, which valve can be opened to regulate or limit the maximum air pressure in the line and therefore the maximum force with which the brakes are applied. This valve is normally closed and remains so during slow stops or the like requiring low pressure to apply the brakes; but in a preferred form of my invention the valve can be opened by either one or both of two valve operating means when a limit on fluid pressure is desired.

The first of these valve operating means is responsive to deceleration of the vehicle and opens the exhaust valve to a greater extent with an increasing rate of deceleration. The other valve operating means is electrically actuated independently of the first means and is adapted to override the first means to the extent that it may cause a greater degree of opening of the exhaust valve than the opening produced by the deceleration responsive means.

This electrically actuated valve operating means is controlled by an electric circuit which includes a first pressure responsive switch that energizes the circuit initially and closes a second switch which is in series with the electrically actuated valve operating means to open the exhaust valve under certain conditions. The circuit also includes a time delay circuit which after a suitable lapse of time is adapted to open the second switch and thus de-energize the valve operating means. The circuit also preferably includes speed responsive switch means and pressure responsive switch means to produce different responses by the circuit at different vehicle speeds existing at the time of initial application of the brakes.

How the above objects and advantages of my invention, as well as others not specifically referred to herein, are attained will be more readily understood by reference to the following description and to the annexed drawing, in which:

Fig. 1 is a schematic representation of a compressed air brake system for a vehicle showing the application thereto of a preferred form of control apparatus for regulating the retardation of the vehicle;

Fig. 2 is a schematic diagram of the electrical circuit of the improved control apparatus; and Fig. 3 is a longitudinal median section through the exhaust valve for the brake air line and the solenoid for operating the valve.

Referring now to Fig. 1 there is shown schematically a conventional type of brake system operated by compressed air and including a reservoir or storage tank 10 as a source of operating air under pressure. Air taken from the tank is replenished by a compressor unit in a known manner, such compressor unit not being shown in the drawing. Reservoir 10 is connected by line 11 to brake valve 12 which is here shown as being a foot-operated type of valve by which the vehicle driver effects application of the brakes.

When open, air passes through brake valve 12 and line 14 into distribution line 15. Line 15 is connected at one end to branch lines 16, each of which leads to a diaphragm type motor unit 18 that applies power to a rod 19 connected to a lever arm, not shown in the drawings, of a front wheel brake assembly. Distribution line 15 is also connected to branch lines 20 which apply air to similar motor units 18 operating rods 19 which are similarly connected by arms, not shown, to the brakes on the rear wheels. These parts of the brake systems are illustrative of many well known brake installations and need not be described in detail.

An element of my control apparatus is suitable means for limiting the pressure at which the operating fluid in the brake system can be supplied to the brakes for application of the brakes. In a compressed air brake system, such means may be the exhaust valve means as indicated generally at 22 and shown in detail in Fig. 3. The valve is connected to air line 15 by branch conduit 23. Inside the valve housing 24 is a body 25 which is provided with interior chamber 26. Chamber 26 is circular in cross-section and contains a piston-like valve member 27 which is adapted to reciprocate axially of chamber 26 and is is provided with an annular groove 28. An O-ring or similar packing member at 27a provides an air tight seal around the valve member to prevent the escape of air from the open end of chamber 26.

Conduit 23 communicates with inlet passage 29 which opens into chamber 26. Exhaust passage 30 communicates between chamber 26 and the atmosphere. Passage 30 is preferably narrow and elongated in the direction of movement of valve 27, as shown diagrammatically in Fig. 1, in order to change the area of the passage open for exhaust of air approximately in proportion to the movement of the valve 27.

Valve member 27 is mounted on rod 32 which passes entirely through valve body 25 and extends beyond the body at opposite ends thereof. When in the rest position shown, valve member 27 closes exhaust port 30 and preferably also inlet port 29. When the valve member is moved to the left as viewed in Fig. 3, groove 28 is placed in registration with passages 29 and 30, allowing air to flow from conduit 23 through inlet passage 29 and groove 28 to exhaust passage 30. The rate of escape is determined by the net area of exhaust passage 30 uncovered by piston 27; and this in turn is controlled by the amount of movement of piston 27 to the left.

Valve member 27 is normally biased to the closed position by spring 34 which bears at one end against ring 35 attached to valve rod 32, and at the other end against solenoid 36 which is stationarily mounted within housing 24. Valve rod 32 extends into solenoid 36 like a movable core. A fixed core 37 limits travel of the valve rod.

Movement of the valve member 27 to an open position can be effected by pendulum 40 that is pivotally mounted at 41 to an arm forming a portion of housing 24. Valve 22 and the pendulum are mounted on the vehicle in such a way that the pendulum is at the rear end of the valve with respect to the direction of forward movement of the vehicle so that when the vehicle slows down the pendulum moves relative to the valve in the direction of arrow 42. The pendulum bears against the right hand end of valve rod 32 so that forward movement of the pendulum 40 moves the valve rod and valve 27 to bring groove 28 opposite exhaust port 30, permitting the escape of air through this port from distribution lines 15. Pendulum 40 is held normally in a neutral position with its suspension rod vertical by tension spring 44 which is attached at one end to a fixed portion of the vehicle frame and at the other end to the pendulum. Spring 44 is typical of means that may be used to restrain the pendulum to damp out small shifts in position in response to the small changes in vehicle speed. Also, it may be strong enough to influence the action of the pendulum in a desired manner. For example, the spring assists in the return of the pendulum to the neutral position allowing valve 27 to close. It may be advantageous to add a dash-pot device as indicated diagrammatically at 43 for the purpose of damping the pendulum motion in either or both directions. Such devices are well known.

Valve 27 can also be opened by means of solenoid 36. When the coil of the solenoid is energized, it draws valve rod 32 toward the left, until it is stopped by engagement with fixed core 37. When the solenoid is energized, valve member 27 is operated to open exhaust port 30; and when the solenoid is de-energized, spring 34 returns the valve member and rod to the closed position shown in Fig. 3. The electric valve operating means is able to operate the valve independently of pendulum 40 since the valve rod can move away from the pendulum. Because of this independent operation of the two separate valve operating means, the electric means can override or exert a superior influence upon valve 22 in that the electric means can move the valve piston 27 regardless of any influence exerted on the valve by the pendulum.

Enclosed within the dotted rectangle 45 of Fig. 1 is an electric circuit for controlling the energization of solenoid 36 and thereby controlling operation of the fluid pressure limiting valve 22. This circuit is shown schematically in detail in Fig. 2.

The control circuit includes battery 48 as a source of power. This may be the ordinary six volt or twelve volt battery commonly installed in the vehicle to operate the ignition system and other auxiliaries. The battery is connected to a ground 49 which may be the frame of the vehicle providing a common return line. To each terminal of the battery there is connected one of the two leads 50 and 51. Across the two leads there is connected a resistance 52 and a condenser 53 in series with each other. At a point between the condenser and the resistance is connected one terminal of switch 54, the switch being in series with operating coil 55 of a relay. The other side of coil 55 is connected to lead 50. Switch 54 is a pressure-operated type, as for example the well known type of switch used to operate vehicle stoplights. It is designed to respond to an increase in pressure in the brake system by closing the contacts at a relatively low pressure, as for example 4 p.s.i. The switch 54 is connected to air distribution line 15 by branch conduit 56.

Relay coil 55 actuates normally open switch 57 which is closed when coil 55 is energized. One side of switch 57 is connected to lead 51 and the other side is connected to lead 58 which connects switch 57 to the common center contact of a double throw switch 60. The normally closed contact 61 of switch 60 is not used, and the normally open contact 62 of switch 60 is connected to one side of solenoid 36. The other side of solenoid 36 is connected to lead 50. Thus switch 57 is in series with switch 60 and solenoid 36.

A second normally open switch 64 is connected between leads 51 and 58 in parallel with switch 57. This switch 64 is part of a relay having an operating coil 65 which is connected at one side to lead 50 and at the other side, by lead 66, to the normally open contact 67 of switch 68. Switch 68 is a double throw switch of which the common center contact is connected by lead 70 through condenser 72 to lead 50. The normally closed contact 71 of switch 68 is connected directly to lead 58.

The two switches 60 and 68 may be entirely separate switches; but they may conveniently be the two poles of a double-pole, double-throw switch in a single relay in which both poles are operated by relay coil 74. Relay coil 74 is connected at one side to lead 50 and, at the other side through lead 75 to a pressure actuated switch indicated generally at 76. The latter switch is indicated in its entirety by the dotted rectangle.

Switch 76 is any suitable type of pressure sensitive electric switch which is connected to the brake system, preferably to line 15, by branch air conduit 78. One well known type of switch as at 76 is that manufactured by Melletron Corp. of Los Angeles, California, designated Model 424. Switch 76 comprises a pair of single pole switches 80 and 81 which are normally open but are closed individually by a pressure responsive member 79, as for example a diaphragm or a similar member, moved in response to an increase in air pressure transmitted to member 79 through branch conduit 78. Switch 80 closes at a lower pressure than does switch 81; and each switch is preferably opened by a pressure drop of approximately 10 p.s.i. below the air pressure at which they close. For example, but without limiting the invention to any particular values, switch 80 may be set to close at 60 p.s.i. and then open when pressure drops to 50 p.s.i. while switch 81 may be set to close at 70 p.s.i and reopens when pressure drops to 60 p.s.i.

Lead 75 is connected to one side of both switches 80 and 81. Switch 81 has its other side connected directly to lead 58 while the other side of switch 80 is connected to lead 58 through a normally closed, speed responsive switch 84 which is adapted to open at a predetermined vehicle speed, for example 20 miles per hour. Switch 84 may be any suitable known type of switch, switches of this character already being known and used on vehicles for various purposes.

As an optional feature in order to introduce certain time delay characteristics which will be more fully disclosed in the operation of relay coil 65, there may be placed in parallel with coil 65 a variable resistance 86 and a fixed resistance 87, the two resistances being in series with each other and connected to leads 50 and 66 across coil 65.

Another optional feature is the provision of lead 89 which connects one contact of switch 54 through normally open switch 90 to lead 50. Switch 90 is arranged to be actuated by coil 65 in unison with switch 64. When energized, coil 65 closes switch 90 and provides a shunt circuit around coil 55 that discharges condenser 53, for reasons that will be explained.

When installing the circuit on a vehicle, the solenoid 36 is advantageously placed in housing 24 to be located at the exhaust valve 22, for obvious reasons. The pressure responsive switches 54 and 76 may be located in any position on the vehicle desired in order to best regulate operation of the brakes. Preferably branch conduits 56 and 78 leading to the switches 54 and 76 are short in order to minimize the time required for build up in the switches of fluid pressure to operative values. Speed responsive switch 84 may have its location on the vehicle dictated by mechanical requirements. The time characteristics of the entire control means can be regulated to some extent by the relative position of the various elements. For example, the closer branch conduit 78 is to exhaust valve 22, the quicker the response of valve 76 to a decrease in air pressure caused by exhaust from valve 22. However the other elements of the circuit, such as the switches, relays, resistors, condensers, and the like, which are all electrical components, can be grouped in a single cabinet which grouping presents obvious advantages in ease of wiring, accessibility for service, and the like. Such a cabinet is indicated diagrammatically in Fig. 1 by the rectangle 91 in order to complete the schematic illustration of my invention.

Having described the apparatus and its control circuit, I shall now describe the operation of my invention. When the brakes are released, the apparatus for controlling the application of the brakes is in a rest or neutral condition with the circuit elements in positions shown in Fig. 2. All of the switches are open, except switch 84 which is normally closed. The operation of the circuit varies with different vehicle speeds at the time of applying the brakes and with the force with which the brakes are applied. The different degrees of control exerted on the brake system will be described with reference to several typical cases.

Assume now, as case #1, that at a relatively low speed, say 15 miles per hour, the brakes are applied with great force to produce rapid deceleration. Fluid pressure in line 15 is transmitted through branch line 56 to close switch 54. This occurs almost immediately as switch 54 is designed to operate at a selected low pressure, say 4 p.s.i. or higher. When switch 54 is closed, coil 55 is energized and closes switch 57 establishing a circuit from battery 48 and lead 51 through switch 57 and lead 58 to the common contact of switch 60. The normally open contact 62 of switch 60 is still open, leaving solenoid 36 de-energized. Closing switch 57 activates the circuit as a whole so that it can respond to other conditions. This initial energization takes place during the initial stage of every application of the brakes.

Because the driver is attempting to bring the vehicle to a rapid stop he opens throttle valve 12 wide, and the pressure in line 15 quickly builds up to 60 p.s.i. or more. It is assumed for illustration that 60 p.s.i. is the pressure, transmitted through branch line 78 to pressure sensitive switch 76, at which switch 80 closes. Switch 81 ordinarily remains open. From lead 58 a circuit is now established through switch 84, which remains closed, switch 80, lead 75, to relay coil 74 and lead 50. The resulting energization of coil 74 changes the position of the double throw switches 60 and 68, the switch blades now being moved into engagement with the normally open contacts 62 and 67 respectively.

When switch 60 closes, the circuit energizing solenoid 36 is completed; and upon energization solenoid 36 moves valve rod 32 toward the left in Fig. 3 to uncover exhaust port 30. This allows operating fluid under pressure to escape from distribution line 15 and has the effect of limiting to 60 p.s.i or slightly more the fluid pressure which can be supplied to brake motors 18 for the application of the brakes. This escape of fluid has the ultimate effect of limiting the retarding force which can be applied to stop the vehicle.

It may be assumed under the conditions of case #1 that the operation of pressure sensitive switch 76 takes place within three seconds following application of the brakes. The control circuit includes a first time delay means for de-energizing the entire circuit after a predetermined interval of time, which for purposes of this illustration is assumed to be three seconds, which is ample time for pendulum 40 to move into control of valve 27. Capacitor 53 and resistance 52 are so arranged as to form a resistance-capacitance circuit which limits the length of time that relay coil 55 remains energized. The values of the resistor and capacitor are selected so that following a predetermined time interval, here assumed as three seconds but it may be more or less, after switch 54 is closed, the current flowing to relay coil 55 drops below the value required to maintain switch 57 closed and as a result switch 57 opens. Since switch 57 is in series with switch 60 and solenoid 36, the opening of this switch de-energizes solenoid 36, releasing valve rod 32. Consequently, the circuit energizes solenoid 36 for a maximum of three seconds, or whatever period the characteristics of the resistance-capacitance circuit determine. After this period solenoid 36 no longer operates the pressure limiting valve 22. It may be noted here that, as explained below, the solenoid 36 may be de-energized in less than three seconds.

When solenoid 36 is de-energized, the valve rod 32 is solely under positional control of pendulum 40; and the position of the pendulum is determined at any instant by the deceleration of the vehicle. The displacement of the pendulum to the left, and therefore the degree of opening of exhaust port 30, bears a fixed relation to the rate of deceleration of the vehicle. After said interval of three seconds, only the deceleration responsive means operates the fluid pressure limiting exhaust valve.

In case #1 the fluid pressure within line 15 exceeds 60 p.s.i. but does not normally exceed 70 p.s.i because the open valve 22 limits the rise in fluid pressure. For this reason switch 81 ordinarily remains open. If it closes this action has no effect on the circuit. As a variant of case #1, if the driver releases the brakes within the three second period, when fluid pressure drops below 50 p.s.i. switch 80 is opened. Opening this switch de-energizes relay coil 74 and opens switches 60 and 68. The result is that, in less than three seconds from initial application of the brakes, the electric means for operating the pressure-limiting valve 22 relinquishes control in favor of the control exerted by pendulum 40 in response to deceleration of the vehicle.

When switch 57 closes and switch 68 is in the rest position shown, with the normally closed contact 71 engaged, condenser 72 is connected by lead 70 between leads 50 and 58 and through switch 57 to lead 51, thus charging the condenser. When the movable switch blade is moved into engagement with the normally open contact 67, this charged condenser is connected across relay coil 65. Energization of coil 65 closes switch 64, in parallel with switch 57, and also switch 90. Condenser 72 in combination with resistances 86 and 87 forms a second independent resistance-capacitance timing circuit which can be adjusted to determine the length of time coil 65 holds switch 64 closed.

When switch 90 closes, it immediately discharges condenser 53, opening switch 57 in less than the three seconds established by the first timing circuit. With switch 57 open, solenoid 36 is now energized through switch 64 and is de-energized when either switch 64 or 80 opens. Thus the last mentioned timing circuit can now break the circuit energizing solenoid 36 before pressure actuated switch 76 can do so. Adjustment of the time characteristic of this circuit can be obtained by making resistor 86 variable, while the range of adjustment can be limited by placing fixed resistance 87 in series with variable resistance 86. By the use of this independent timing circuit the time that solenoid 36 remains energized after switch 60 is closed is now controlled by either of two conditions, one of them is a drop in fluid pressure applied to the brakes and the other is the passage of time. This second timing circuit becomes operative after closing switch 64. The auxiliary circuit through switch 90 is preferably used to neutralize the first timing circuit and definitely transfer time control to the second circuit. It also operates to prevent a second pulse from energizing solenoid 36 during a single application of the brakes.

In case #2, assume that from any speed the driver brings the vehicle to a slow stop. The passengers are decelerating at a rate close to that of the vehicle and now the regulation problem is simpler. When making a slow stop the driver only opens valve 12 partially, and the fluid pressure in line 15 and other parts of the brake systems remains within a relatively low range of values. In this low range of values, switch 57 closes as described but switch 76 is not actuated. Accordingly switch 60 remains open and solenoid 36 is not energized. The result is that the only means effective to operate valve 22 is the deceleration responsive pendulum 40 which moves the valve member 27 to the left to open more or less of exhaust port 30 and thus exert a greater or lesser effect upon limiting the fluid pressure available within brake conduits 15, 16, and 20 to apply the brakes. Under these circumstances the relay coil 55 is de-energized after the same interval of time to reopen switch 57 but opening this switch now has no effect upon solenoid 36 since the electrically actuated means did not operate the exhaust valve.

The pendulum can exert adequate control over the pressure limiting valve 22 when the stop is a slow one. The pendulum exerts its greatest effect when the bus is empty. Then the need for high fluid pressure is least. During slow deceleration the pendulum operates satisfactorily. During fast deceleration the response of the pendulum is too slow and the electrically actuated means for operating valve 22 provides a faster pulse type response when brakes are applied. After initial control is exerted and passengers and vehicle are slowing at the same rate, control can be turned over to the pendulum.

Switch 84 is adjusted to open in response to the speed of the vehicle at some value, for example 20 m./p./h., which is the boundary between the high and low speed ranges. In case #3, assume the vehicle is moving faster than 20 m./p./h. when the brakes are applied. With switch 84 open, the operation of the circuit is exactly the same as previously described except that switch 80 is ineffective to energize coil 74 and the circuit previously completed by closing switch 80 is now completed by closing switch 81 in parallel with switch 80. Switch 81 closes at a higher fluid pressure in line 15, for example 70 p.s.i., and like switch 80 it opens after a drop of say ten pounds in the fluid pressure, reopening at 60 p.s.i. Thus the circuit responds to a higher vehicle speed by operating the valve 22 in a manner to raise the limit that the open valve places on unit pressure of the brake operating fluid when the vehicle speed exceeds a predetermined value.

It can thus be seen that by limiting the maximum deceleration of the vehicle near the time of vehicle load shift, the vehicle wheels are not apt to lock which means that higher maximum air pressure may be used in the brake system with safety. The load shift occurs when the passengers and vehicle are decelerating at the same rate or when the dead weight of an empty bus has transferred the maximum load to the front wheels.

It will be clear from the above that various changes may be made in the design and arrangement of the various elements of the apparatus for regulating the retardation of a vehicle without departing from the broad spirit and scope of my invention. For example, the pendulum may be omitted, and only the electrical circuit means used to control the pressure-limiting means. Also, this pressure-limiting means may take other forms and be at other locations. It can be a known type of means in brake valve 12 or line 14 to limit the passage of operating fluid and thereby limit the pressure supplied to apply the brakes. In a hydraulic system with a vacuum booster, valve 22 can be so located as to limit the vacuum developed and thereby the assisting force developed to apply the brakes. Accordingly it is to be understood that the foregoing description is considered to be illustrative of rather than limitative upon the invention as defined in the appended claims.

I claim:

1. In a fluid actuated brake system for an automobile, apparatus for regulating the retardation of the vehicle by application of the brakes, comprising: a normally closed valve venting the system to the atmosphere to limit the pressure in said system of fluid supplied to the brakes; electrically actuated operating means for opening the normally closed valve; and electrical circuit means for energizing said operating means, said circuit means including a pressure-responsive switch subjected to fluid pressure existing in said system to be actuated when the pressure in said system exceeds a predetermined brake operating pressure, said switch energizing the circuit means to open the normally closed valve to limit pressure in the system to said predetermined value, said electrical circuit including circuit elements that de-energize the electrical circuit after a predetermined interval of time following application of the brakes to render the circuit means ineffective to open the normally closed valve.

2. In a fluid actuated brake system for an automobile, apparatus for regulating the retardation of the vehicle by application of the brakes, comprising: pressure limiting means operable to limit the pressure at which fluid is supplied to the brakes; electrically actuated operating means for operating said pressure limiting means; and electric circuit means controlling said electrically actuated operating means and including a first fluid pressure actuated switch adapted to close in response to a low fluid pressure in the brake system and energize the circuit means; relay means having an operating coil energized by closing the first switch, and contacts closed by said coil when energized; a second switch connected in series with the relay contacts and with the electrically actuated operating means; and pressure responsive means closing the second switch in response to a relatively higher predetermined fluid pressure in the brake system, thereby energizing the electrically actuated operating means when the relay contacts are also closed.

3. The combination as in claim 2 in which the means closing the second switch also opens the second switch in response to a predetermined drop in fluid pressure; and which also includes time delay means to open the second switch after the lapse of a predetermined length of time following closing the switch.

4. In a fluid actuated brake system for a vehicle, apparatus for regulating the retardation of the vehicle effected by application of the brakes comprising: fluid pressure limiting means operable to limit the pressure at which fluid is supplied to the brakes; electrically actuated operating means for operating said pressure limiting means; and electric circuit means controlling said electrically actuated operating means and including a first switch; fluid pressure actuated means adapted to close the first switch in response to a low fluid pressure in the brake system; relay means including a second normally open switch connected in series with the first switch and in series with the electrically actuated operating means; means to actuate the relay means and close the second switch in response to any one of a plurality of higher pressures in the brake system to energize the electrically actuated operating means; and means responsive to the vehicle speed to render ineffective the response of said relay actuating means to all but one of said higher pressures.

5. In a fluid actuated brake system for a vehicle, apparatus for regulating the retardation of the vehicle effected by application of the brakes comprising: fluid pressure limiting means operable to limit the pressure at which fluid is supplied to the brakes; electrically actuated operating means for operating said pressure limiting means; and electric circuit means controlling said electrically actuated operating means and including a first fluid pressure actuated switch adapted to close in response to a low fluid pressure in the brake system; relay means including an operating coil in series with the first switch and a second normally open switch connected in parallel with the first switch and in series with the electrically actuated operating means; a pair of switches connected in parallel and closed sequentially by means responsive to fluid pressure in the brake system to energize the electrically actuated operating means; and normally closed switch means in series with the one of said pair of switches that closes first adapted to neutralize said one switch when the vehicle speed exceeds a predetermined value.

6. In a fluid actuated brake system for a vehicle, apparatus for regulating the retardation of the vehicle effected by application of the brakes comprising: fluid pressure limiting means operable to limit the pressure at which fluid is supplied to the brakes; electrically actuated operating means for operating said pressure limiting means; and electric circuit means controlling said electrically actuated operating means and including a first switch fluid pressure actuated means adapted to close the first switch in response to a low fluid pressure in the brake system; time delay means opening said first switch after a predetermined time; a second normally open switch in series with the first switch and with the electrically actuated operating means; a third normally open switch in parallel with the first switch and in series with the second switch; means to close both the second and third switches in response to a relatively high fluid pressure in the brake system to thereby energize the electrically actuated operating means; and a second separate time-delay means opening said third switch after a predetermined time.

7. The combination as in claim 6 that also includes an auxiliary circuit including a fourth switch closed simultaneously with the third switch to cause the first time delay means to open the first switch substantially immediately.

8. In a fluid actuated brake system for a vehicle, apparatus for regulating the retardation of the vehicle effected by application of the brakes comprising: a normally closed valve venting to the atmosphere for limiting the pressure at which fluid is supplied to the brakes for application of the brakes; a first means for directly operating said pressure-limiting valve in response to deceleration of the vehicle; separate electrically actuated operating means for simultaneously operating said pressure-limiting means independently of said first operating means; and electric circuit means controlling said electrically actuated operating means and including pressure-responsive switch means closed by a high predetermined fluid pressure in the system to actuate the operating means and thereby limit fluid pressure in the system substantially to said high pressure.

9. The combination as in claim 8 in which the circuit means includes time delay means for de-energizing the electrical circuit after a predetermined interval of time following application of the brakes to render ineffective the electrically actuated operating means, to restore the pressure-limiting means to the sole control of the first operating means.

10. In a fluid actuated brake system for a vehicle, apparatus for regulating the retardation of the vehicle effected by application of the brakes comprising: fluid pressure limiting means operable to limit the pressure at which fluid is supplied to the brakes; electrically actuated operating means for operating said pressure limiting means; and electric circuit means controlling said electrically actuated operating means and including a pair of switches connected in parallel with each other and in series with the electrically actuated operating means and closed sequentially by means responsive to fluid pressure in the brake system to energize the electrically actuated operating means; and normally closed switch means in series with the one of said pair of switches that closes first adapted to neutralize said one switch when the vehicle speed exceeds a predetermined value.

References Cited in the file of this patent

UNITED STATES PATENTS

| | | |
|---|---|---|
| 902,183 | Turner et al. | Oct. 27, 1908 |
| 2,096,505 | Baughman | Oct. 19, 1937 |
| 2,109,168 | Miller | Feb. 22, 1938 |
| 2,198,029 | Farmer | Apr. 23, 1940 |
| 2,256,285 | Hines | Sept. 16, 1941 |
| 2,396,424 | Hines et al. | Mar. 12, 1946 |